(12) United States Patent
Ha et al.

(10) Patent No.: US 12,464,385 B2
(45) Date of Patent: Nov. 4, 2025

(54) COMMUNICATION IN WIRELESS COMMUNICATION NETWORK

(71) Applicant: ELECTRONICS AND TELECOMMUNICATIONS RESEARCH INSTITUTE, Daejeon (KR)

(72) Inventors: Jeoung Lak Ha, Daejeon (KR); Yoo Hwa Kang, Daejeon (KR); Changki Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 521 days.

(21) Appl. No.: 17/696,557

(22) Filed: Mar. 16, 2022

(65) Prior Publication Data
US 2022/0303804 A1 Sep. 22, 2022

(30) Foreign Application Priority Data
Mar. 17, 2021 (KR) .................. 10-2021-0034682
Mar. 16, 2022 (KR) .................. 10-2022-0032561

(51) Int. Cl.
*H04W 24/08* (2009.01)
*H04W 56/00* (2009.01)

(52) U.S. Cl.
CPC ......... *H04W 24/08* (2013.01); *H04W 56/001* (2013.01)

(58) Field of Classification Search
CPC .. H04L 43/0852; H04L 43/087; H04W 24/08; H04W 56/001; H04W 24/10
See application file for complete search history.

(56) References Cited

U.S. PATENT DOCUMENTS

| 10,904,827 | B2 | 1/2021 | Albasheir et al. |
| 2014/0052965 | A1 | 2/2014 | Sarel |
| 2020/0329441 | A1 | 10/2020 | Ha et al. |
| 2020/0359244 | A1 | 11/2020 | Yao et al. |
| 2020/0404697 | A1 | 12/2020 | Yang et al. |
| 2021/0049042 | A1 | 2/2021 | Suh |
| 2021/0153048 | A1* | 5/2021 | Velev .................. H04W 24/08 |
| 2021/0204172 | A1 | 7/2021 | Rost et al. |
| 2022/0303804 | A1* | 9/2022 | Ha ....................... H04W 24/08 |

(Continued)

FOREIGN PATENT DOCUMENTS

| JP | 2015509622 A | 3/2015 |
| KR | 1020200108036 A | 9/2020 |

(Continued)

OTHER PUBLICATIONS

Sunmi Jun et al., Ultra low latency services in 5G systems, A perspective from 3GPP standards, ETRI Journal, vol. 42, No. 5, pp. 724-736(May 9, 2020).

(Continued)

*Primary Examiner* — Raj Jain
(74) *Attorney, Agent, or Firm* — Rabin & Berdo, P.C.

(57) ABSTRACT

Provided is a method of jitter monitoring for time sensitive communication (TSC) in a wireless communication network. The method of jitter monitoring may include: receiving, by a user plane function (UPF), a delay and jitter measurement request from an application function (AF); measuring, by the UPF, a delay and a jitter in response to the delay and jitter measurement request; and transmitting, by the UPF, the measured delay and jitter to the AF.

10 Claims, 14 Drawing Sheets

(56) References Cited

U.S. PATENT DOCUMENTS

2022/0353732 A1* 11/2022 Filippou ............ H04W 28/0289
2023/0164600 A1* 5/2023 Li ....................... H04L 41/5009
370/329

FOREIGN PATENT DOCUMENTS

| KR | 20210020570 A | 2/2021 |
|----|---------------|--------|
| WO | 2019139752 A1 | 7/2019 |
| WO | 2020/035127 A1 | 2/2020 |

OTHER PUBLICATIONS

Yu Jun Yeol, "A resource-management scheme for energy-efficient ML inference services in a heterogeneous GPU—cloud", Department of Electrical and Computer Engineering, Sungkyunkwan University (Feb. 28, 2022).

\* cited by examiner

COMMUNICATION IN WIRELESS COMMUNICATION NETWORK

CROSS-REFERENCE TO RELATED APPLICATION

This application claims priority to and the benefit of Korean Patent Application No. 10-2021-0034682 filed in the Korean Intellectual Property Office on Mar. 17, 2021, and Korean Patent Application No. 10-2022-0032561 filed in the Korean Intellectual Property Office on Mar. 16, 2022, the entire contents of which are incorporated herein by reference.

BACKGROUND OF THE DISCLOSURE

(a) Field of the Disclosure

The present disclosure relates to a method of jitter monitoring for time sensitive communication (TSC) in a wireless communication network, and more particularly, to delay measurement for time sensitive communication, jitter measurement depending on a change of delays, and a reporting method of the measured delay and jitter in a wireless communication system.

When a 5G system which is the wireless communication system operates as a virtual bridge for time sensitive networking (TSN), measurement and management of a delay and a jitter of the virtual bridge are required to set an operation of the TSN by reflecting characteristics of the delay in the bridge. The present disclosure relates to delay measurement of a virtual bridge having a form of a wireless communication system, measurement of a jitter, and a report method of the measured delay and jitter.

(b) Description of the Related Art

When a 5G system which is a wireless communication system operates as a virtual bridge for TSN, in order to measure a delay in the virtual bridge, quality of service (QoS) monitoring is performed by using a radio access network (RAN) in a user plane function (UPF), and the RAN replies a delay with measured user equipment (UE) to the UPF to measure a delay between the UPF and the UE. In regard to TR 23.700-20, for the measurement of the delay, a scheme is researched, which reports information on the delay measured by the UPF to a policy control function (PCF) via a session management function (SMF), and calculating a result of accumulating statistical change characteristics of a jitter by a method of IETF RFC1889 by using the information on the delay reported to the PCF and reports the calculated result to an application function (AF) which is a TSN application function element is researched.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide delay measurement of a virtual bridge, jitter measurement depending on a change between delays, and a report method of the measured delay and jitter when a 5G system which is a wireless communication system operates as a virtual bridge for TSN.

An example embodiment of the present disclosure provides a method of jitter monitoring for time sensitive communication in a wireless communication network may include: receiving, by a user plane function (UPF), a delay and jitter measurement request from an application function (AF); measuring, by the UPF, a delay and a jitter in response to the delay and jitter measurement request; and transmitting, by the UPF, the measured delay and jitter to the AF.

In an example embodiment, the delay and jitter measurement request may be generated at the time of establishment or modification an AF session, and the receiving of the delay and jitter measurement request from the AF by the UPF may include receiving, by the UPF, the delay and jitter measurement request from the AF through at least one of a network exposure function (NEF), a policy control function (PCF), and a session management function (SMF).

In an example embodiment, the delay and jitter measurement request may be generated by event subscription for the AF session, and the receiving of the delay and jitter measurement request from the AF by the UPF may include receiving, by the UPF, the delay and jitter measurement request from the AF through at least one of the NEF, unified data management (UDM), and the SMF.

In an example embodiment, the measuring of the delay and the jitter by the UPF may include at least one of measuring the delay and the jitter based on a difference between a time when the UPF transmits data and a time when a user equipment (UE) receives the data, and measuring the delay and the jitter based on a difference between a time when the UE transmits the data and a time when the UPF receives the data.

In an example embodiment, the transmitting of the measured delay and jitter to the AF by the UPF may include transmitting, by the UPF, the measured delay and jitter to the AF through at least one of the SMF and the NEF.

Another example embodiment of the present disclosure provides a network entity of a 5G system which operates as a time sensitive networking (TSN) bridge, which may include: a network interface transmitting and receiving data to and from another network entity; and a processor performing the jitter monitoring method.

Yet another example embodiment of the present disclosure provides a method of jitter monitoring for time sensitive communication in a wireless communication network, which may include: receiving, by an SMF, a delay and jitter measurement request from an AF; transmitting, by the SMF, a delay measurement request to a UPF; receiving, by the SMF, a delay measured by the UPF from the UPF; measuring, by the SMF, a jitter based on the delay received from the UPF; and transmitting, by the SMF, the delay measured by the UPF and the jitter measured by the SMF to an AF.

In an example embodiment, the delay and jitter measurement request may be generated at the time of establishment or modification an AF session, and the receiving of the delay and jitter measurement request from the AF by the SMF may include receiving, by the SMF, the delay and jitter measurement request from the AF through at least one of an NEF and a PCF.

In an example embodiment, the delay and jitter measurement request may be generated by event subscription for the AF session, and the receiving of the delay and jitter measurement request from the AF by the SMF may include receiving, by the SMF, the delay and jitter measurement request from the AF through at least one of the NEF and UDM.

In an example embodiment, the receiving of the delay measured by the UPF from the UPF by the SMF may include at least one of receiving, by the SMF, a delay measured based on a difference between time when the UPF transmits data and a time when a UE receives the data from the UPF, and receiving, by the SMF, a delay measured based on a difference between a time when the UE transmits the data and a time when the UPF receives the data from the UPF In an example embodiment, the transmitting of the delay measured by the UPF and the jitter measured by the SMF to the AF by the SMF may include transmitting, by the SMF, the delay measured by the UPF and the jitter measured by the SMF to the AF through the NEF.

Still yet another example embodiment of the present disclosure provides a network entity of a 5G system which operates as a time sensitive networking (TSN) bridge, which may include: a network interface transmitting and receiving data to and from another network entity; and a processor performing the jitter monitoring method.

Still yet another example embodiment of the present disclosure provides a method of jitter monitoring for time sensitive communication in a wireless communication network may include: receiving, by a network TSN translator (NW-TT) or a device side TSN translator (DS-TT), a delay and jitter measurement request from an AF; measuring, by the NW-TT or the DS-TT, a delay and a jitter in response to the delay and jitter measurement request; and transmitting, by the NW-TT or the DS-TT, the measured delay and jitter to the AF.

In an example embodiment, the delay and jitter measurement request may be generated at the time of establishment or modification an AF session, and the receiving of the delay and jitter measurement request from the AF by the NW-TT or the DS-TT may include receiving, by the NW-TT, the delay and jitter measurement request from the AF through at least one of an NEF, a PCF, and an SMF, or receiving, by the DS-TT, the delay and jitter measurement request from the AF through at least one of the NEF, the PCF, the SMF, an access and mobility management function (AMF), and radio access network (RAN).

In an example embodiment, the delay and jitter measurement request may be generated by event subscription for the AF session, and the receiving of the delay and jitter measurement request from the AF by the NW-TT or the DS-TT may include receiving, by the NW-TT, the delay and jitter measurement request from the AF through at least one of the NEF, UDM, and the SMF, or receiving, by the DS-TT, the delay and jitter measurement request from the AF through at least one of the NEF, the UDM, the SMF, the AMF, and the RAN.

In an example embodiment, the measuring of the delay and the jitter by the NW-TT or the DS-TT may include measuring, by the NW-TT, the delay and the jitter based on a difference between a time when the DS-TT receives a time synchronization protocol message from the outside of the 5G system or a time when the DS-TT transmits the time synchronization protocol message to the NW-TT, and a time when the NW-TT receives the time synchronization protocol message or a time when the NW-TT transmits the time synchronization protocol message to the outside of the 5G system.

In an example embodiment, the transmitting of the measured delay and jitter to the AF by the NW-TT or the DS-TT may include transmitting, by the NW-TT, the measured delay and jitter to the AF through an SMF and an NEF.

In an example embodiment, the measuring of the delay and the jitter by the NW-TT or the DS-TT may include measuring, by the NW-TT, the delay and the jitter based on a difference between a time when the NW-TT or another DS-TT receives a time synchronization protocol message from the outside of the 5G system or a time when the NW-TT or another DS-TT transmits the time synchronization protocol message to the DS-TT, and and a time when the DS-TT receives the time synchronization protocol message or a time when the DS-TT transmits the time synchronization protocol message to the outside of the 5G system.

In an example embodiment, the transmitting of the measured delay and jitter to the AF by the NW-TT or the DS-TT may include transmitting, by the DS-TT, the measured delay and jitter to the AF through at least one of the RAN, the AMF, the SMF, and the NEF.

Still yet another example embodiment of the present disclosure provides a network entity of a 5G system which operates as a time sensitive networking (TSN) bridge, which may include: a network interface transmitting and receiving data to and from another network entity; and a processor performing the jitter monitoring method.

DETAILED DESCRIPTION OF THE EMBODIMENTS

Figure 1:
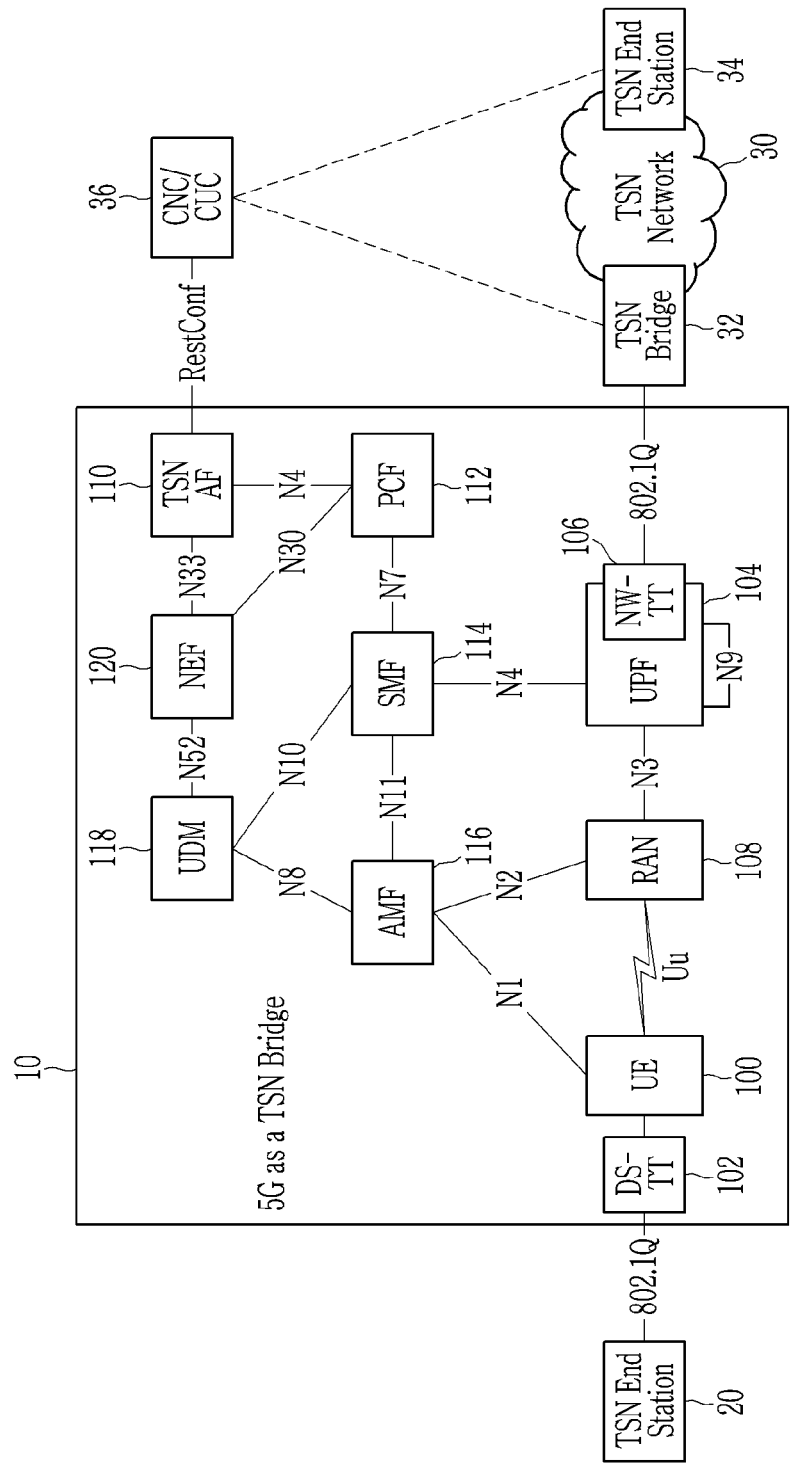
FIG. 1 is a diagram for describing a wireless communication system according to an example embodiment of the present disclosure.

The present disclosure will be described more fully hereinafter with reference to the accompanying drawings, in which example embodiments of the disclosure are shown.

As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and the claims, unless explicitly described to the contrary, the word "comprise", and variations such as "comprises" or "comprising", will be understood to imply the inclusion of stated elements but not the exclusion of any other elements.

FIG. 1 is a diagram for describing a wireless communication system according to an example embodiment of the present disclosure.

Referring to FIG. 1, an example is illustrated in which TSN is provided as a TSC service in the wireless communication system, and the wireless communication system operates as a bridge for the corresponding TSN. As translators for both TSN systems 20 and 30 as a TSN bridge, DS-TT 102 and NW-TT 106 may operate by interlocking with a UE 100 and a UPF 104 of the wireless communication system, respectively. CNC/CUC 36 may collect shape information and requirements of a TSN end station in the TSN system, and define instruct characteristics of the TSN bridge and the TSN end stations. TSN AF (hereinafter, referred to as "AF") 110 may receive the operation as the TSN bridge for the TSN service from the CNC, and request the operation as the TSN bridge to PCF 112 through NEF 120 or directly. Whether the TSN AF 110 is to request the PCF 112 through the NEF 120 or request the PCF 112 directly may be set according to a shape of the network.

Actual communication of TSC is made by a communication bearer provided via the UPF 104, the RAN 108, and the UE 100, and a control therefor is made through the PCF 112 and the SMF 114.

The AF 110 is a functional element that controls an application in a 5G system. An AF session as a session set with an explicit session description before using a service may be an application level session set by an application level signal protocol provided by the AF. The AF 110 may set a QoS of the application session through the AF session.

A conventional scheme in which the PCF calculates a delay after delay information measured by the UPF is reported to the PCF via the SMF has a problem in trade-off between accuracy of a jitter measurement value according to a report period of the delay information, and efficiency of message transfer. When measurement and report periods of the delay are long, the accuracy deteriorates and when the measurement and report periods of the delay are short, the accuracy is enhanced, while the efficiency deteriorates according to flooding of a delay information message.

Meanwhile, in order to support time sensitive communication, other statistical information including a maximum value during a predetermined time is further required than a result of accumulating statistical change characteristics of a jitter when applying a hold and forward buffering mechanism. The hold and forward buffering scheme is a scheme which allows data reaching before a specific time to stand by until the specific time in order to provide scheduled traffic characteristics to transmit data only at the specific time, and whether the data may be transmitted within the specific time should be judged by using the delay or jitter information. To this end, various analyses for the jitter are required.

Further, in providing data communication for a specific service, verifying whether a data flow of the corresponding service is serviced with a delay and a jitter of a predetermined level or less is required.

Hereinafter, a method for calculating the delay by using ingress timestamping (TSi) for representing a delay of a time synchronization protocol message of a time sensitive communication network in which 5G as an underlay network is an overlay network in a network environment in which the time sensitive communication network is overlaid to the 5G network, a method for calculating even the jitter by using a delay measured through QoS monitoring in the UPF, and then reporting the calculated jitter to the AF via the SMF and the PCF and a method for reporting the delay measured through the QoS monitoring in the UPF to the SMF and calculating the jitter in the SMF and reporting the calculated jitter to the AF via the PCF, and a method for calculating and reporting a result of accumulating statistical change characteristics of the jitter in the related art at the time of calculating the jitter, and a maximum jitter, an average delay, a maximum delay, a minimum delay, a distribution of the delay, etc., will be described in detail.

Figure 2:
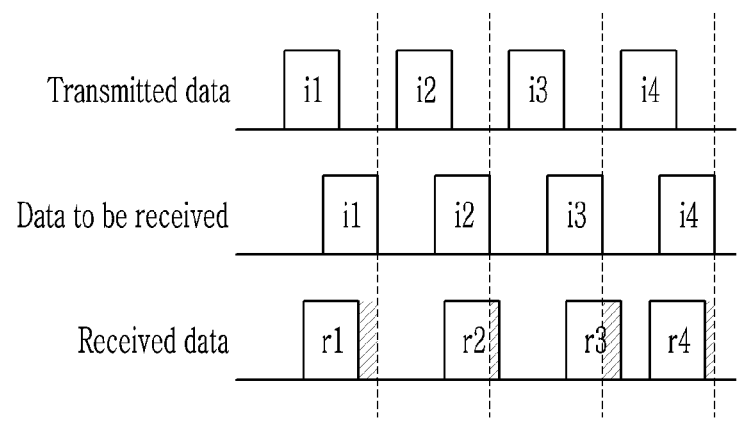
FIG. 2 is a diagram for describing a jitter which may be generated in a TSC service.

FIG. 2 is a diagram for describing a jitter which may be generated in a TSC service.

Referring to FIG. 2, a time-aware shaper of IEEE 802.1Q may be applied to transmitted data (i1, i2, i3, and i4) in order to receive data after a predetermined delay. Data (i1, i2, i3, and i4) to be received may follow the delay in the network, and the jitter may occur in the received data (r1, r2, r3, and r4) according to a change of the delay in the network. The jitter may degrade a quality of the TSC service for time sensitive data.

Figure 3:
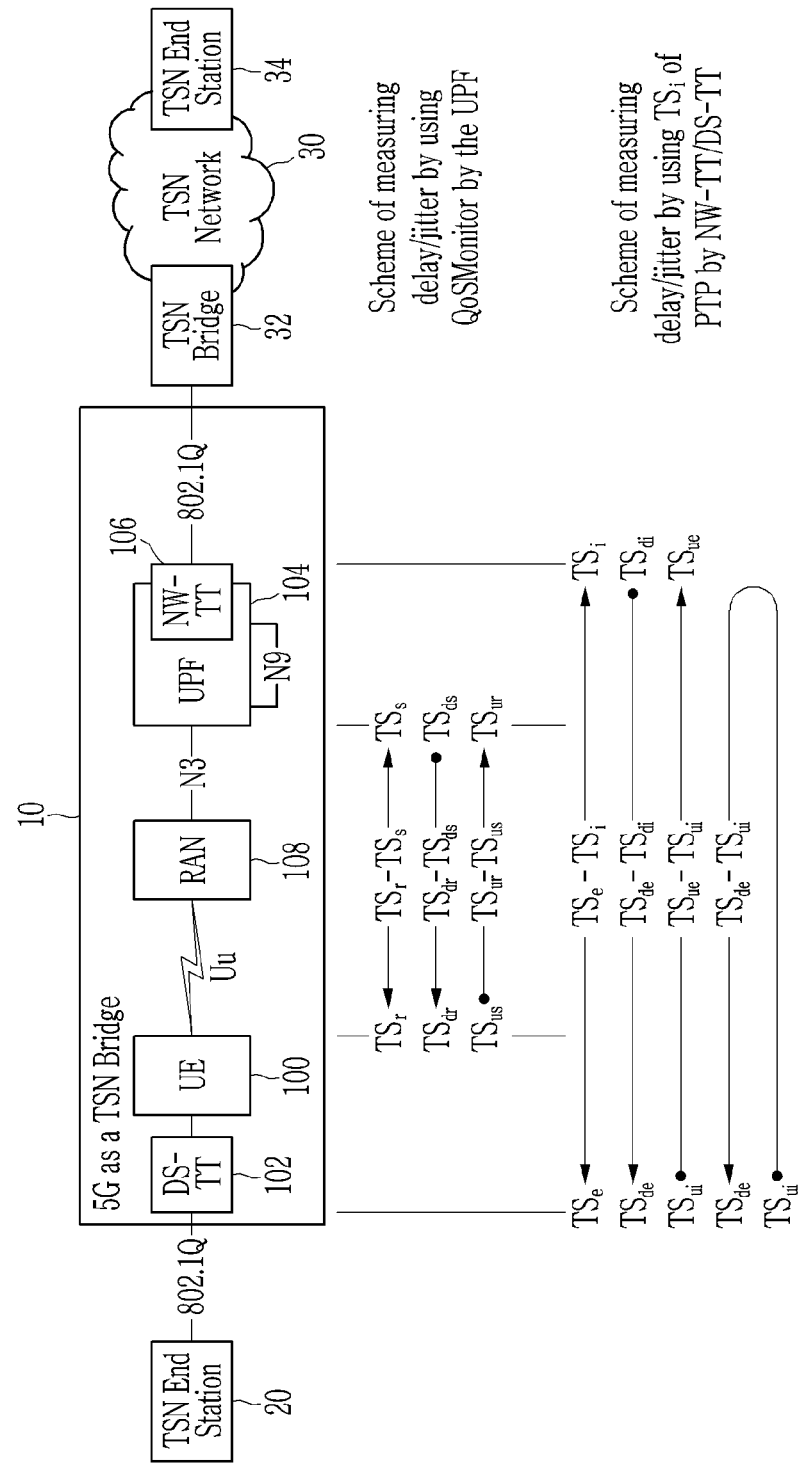
FIG. 3 is a diagram for describing an example method of measuring a delay and a jitter in a wireless communication system according to an example embodiment of the present disclosure.

FIG. 3 is a diagram for describing an example method of measuring a delay and a jitter in a wireless communication system according to an example embodiment of the present disclosure.

Referring to FIG. 3, while the time-aware shaper may control the jitter in a section controlled by an IEEE 802.1Q protocol, monitoring the delay and the jitter in the 5G network in which various network entities may be required, and the delay and the jitter which may occur in the TSC service may be measured as follows.

In respect to the delay and the jitter between the UPF 104 and the UE 100 except for the DS-TT 102 and the NW-TT 106, the delay and the jitter may be measured by using difference a time (TSs) when the UPF 104 transmits data and a time (TSr) when the UE 100 receives data. Specifically, a delay for downlink data may be represented by TSdr−TSds (here, TSdr represents a time when the UE 100 receives the downlink data and TSds represents a time when the UPF 104 transmits the downlink data), a delay for uplink data may be represented by TSur−TSus (here, TSur represents a time when the UPF 104 receives the uplink data and TSus represents a time when the UE 100 transmits the uplink data), and the delays may be calculated through the QoS monitoring performed by the UPF 104. The delay for the downlink data measured by the UE 100 may be reported to the UPF 104.

Transferring the time synchronization protocol message used by the TSC service is supported in the 5G network, and time information may be transferred in a form of suffix data of a Sync message or a Follow-up message of the time synchronization protocol message. When the time synchronization protocol message is transferred from the NW-TT 106 to the DS-TT 102, a time (TSi) when the NW-TT 106 of the 5G network receives a sync message of gPTP is managed, and this may be provided to the DS-TT 102 as the suffix data of the time synchronization protocol message. The DS-TT 102 may manage a time (TSe) of transmitting the corresponding sync message to the TSN network including the TSN end station 20. From this, the DS-TT 102 may calculate the delay as TSe−TSi.

Specifically, when the time synchronization protocol message is provided downlink from the NW-TT 106, the DS-TT 102 may measure the delay of the time synchronization protocol message as TSde−TSdi (here, TSde represents a time of transmitting the time synchronization protocol message to the outside of the 5G system DS-TT 102 and TSdi represents a time of receiving the time synchronization protocol message from the outside of the 5G system NW-TT 106), and when the time synchronization protocol message is provided uplink from the DS-TT 102, the NW-TT 106 may measure the delay of the time synchronization protocol message as TSue−TSui (here, TSue represents a time when the NW-TT 106 transmits the time synchronization protocol message to the outside of the 5G system and TSui represents a time when the DS-TT 102 receives the time synchronization protocol message from the outside of the 5G system). Furthermore, when the DS-TT 102 may include a first DS-TT and a second DS-TT different from the first DS-TT, the first DS-TT1 provides the time synchronization protocol message uplink, and the NW-TT 106 transfers the time synchronization protocol message to the second DS-TT DS-TT2 downlink again, the first DS-TT may provide TSi and the second DS-TT may measure TSe, and then the second DS-TT may calculate TSde−TSui (here, TSde represents a time when the second DS-TT transmits the time synchronization protocol message to the outside of the 5G system and TSui represents a time when the first DS-TT receives the time synchronization protocol message from the outside of the 5G system).

In some example embodiments of the present disclosure, as a method for applying principles of TSi and TSe, a delay and jitter measuring message between the TTs may be extended to be utilized so that the second TT may calculate TSe−TSi by representing a time when any first TT transmits as TSi and representing a time when the other second TT receives as TSe, between the TTs of the DS-TT 102 and the NW-TT 106. Specifically, the first TT transmits TS1 through the delay and jitter measuring message and the second TT calculates TS2−TS1 from TS2 which is a time of receiving the delay and jitter measuring message to acquire a delay between the first TT and the second TT, and measure a jitter between the delays. In this case, protocol header information of the delay and jitter measuring message transmitted by the first TT should be set so that a data flow to be measured may be applied to a QoS flow which is the same as a QoS flow applied in the 5G network.

The description is expressed by an equation as below. When the UPF 104 performs the QoS monitoring, a delay of a j-th packet may be described as D5gs(j)=TSr(j)−TSs(j), and the uplink and the downlink may be described as Du5gs(j)=TSur(j)−TSus(j) and Dd5gs(j)=TSdr(j)−TSds(j), respectively. Meanwhile, when the DS-TT 102 or the NW-TT 106 calculates the delay by using the time synchronization protocol message, the delay of the j-th packet may be described as Dtt(j)=TSe(j)−TSi(j), and the uplink and the downlink may be described as Dutt(j)=Tsue(j)−Tsui(j) and Ddtt(j)=Tsde(j)−TSdi(j), respectively.

In both a case where the UPF 104 performs the QoS monitoring and a case where the DS-TT 102 or the NW-TT 106 calculates the delay by using the time synchronization protocol message, the jitter for the delay from the j-th packet up to a k-th packet may be calculated as below. The following description is made by the j-th packet and the k-th packet, but the same is applied even though the j-th packet and the k-th packet are changed to specific times j and k.

meanD(j:k)=AVG(D(j):D(k)): A delay average from the j-th packet up to the k-th packet.

maxD(j:k)=MAX(D[j:k]): A maximum delay from the j-th packet up to the k-th packet.

minD(j:k)=MIN(D[j:k]): A minimum delay from the j-th packet up to the k-th packet.

maxJ(j:k)=MAX(maxD(j:k)−meanD(j:k), ABS(minD(j:k)−meanD(j:k))): A maximum jitter from the j-th packet up to the k-th packet.

A(k)=A(k−1)+(ABS(D(k−1)−D(k))−A(k−1))/16: Statistical change characteristics of the jitter up to the k-th packet (IETF RFC 1889).

varD(j:k)=E[(D[j:k]−meanD(j:k))2]: A distribution of the delay from the j-th packet up to the k-th packet.

Hereinafter, the jitter monitoring method according to the example embodiments of the present disclosure will be described in detail.

Figure 4:
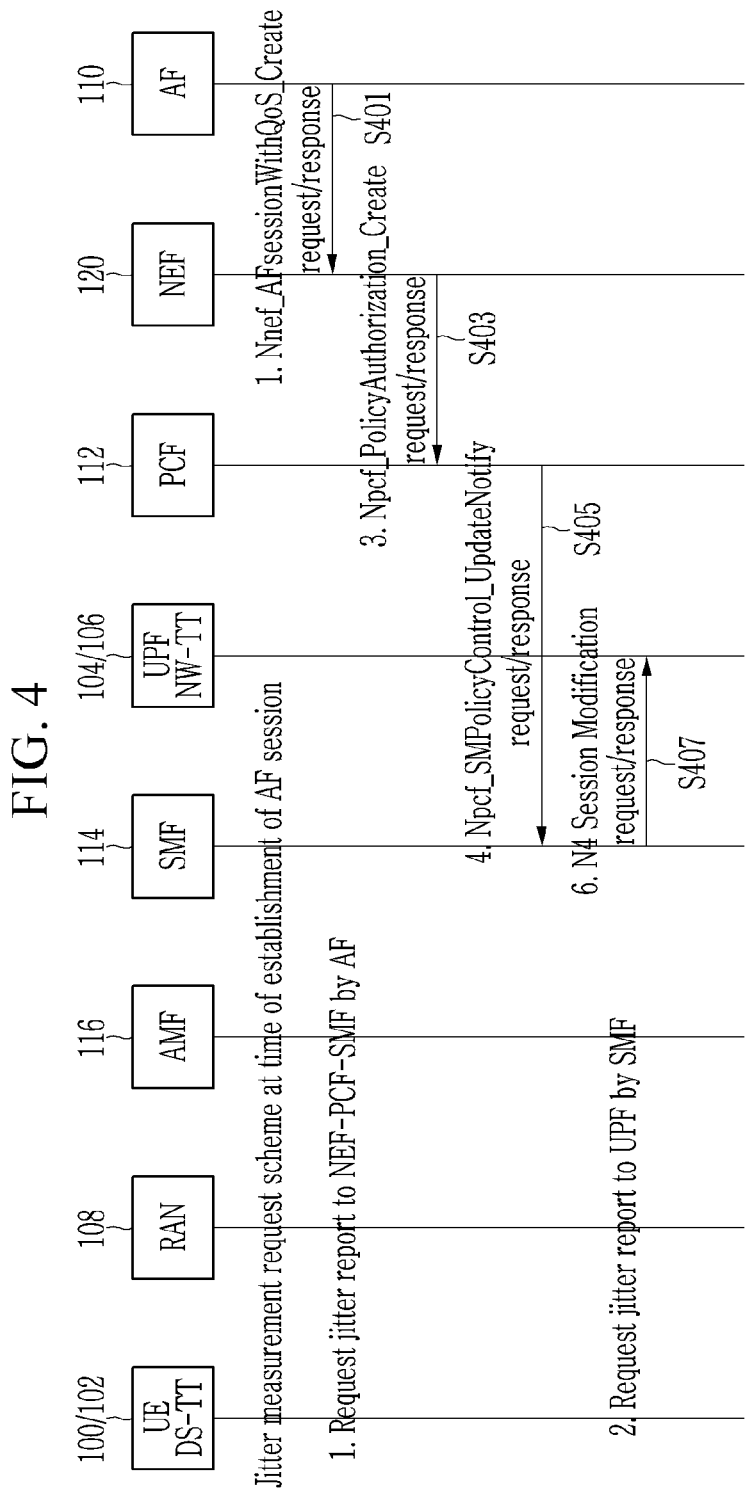
FIG. 4 is a diagram for describing an example method for requesting delay and jitter measurement according to an example embodiment of the present disclosure.

FIG. 4 is a diagram for describing an example method for requesting delay and jitter measurement according to an example embodiment of the present disclosure.

First, the jitter monitoring method according to an example embodiment of the present disclosure may include: a step of receiving, by the UPF 104, a delay and jitter measurement request from the AF 110; a step of measuring, by the UPF 104, a delay and a jitter in response to the delay and jitter measurement request; and a step of transmitting the delay and the jitter measured by the UPF 104 to the AF 110.

Referring to FIG. 4, the delay and jitter measurement request may be generated at the time of establishment the AF session, and the receiving of the delay and jitter measurement request from the AF 110 by the UPF 104 may include a step of receiving, by the UPF 104, the delay and jitter measurement request from the AF 110 through the NEF 120, the PCF 112, and the SMF 114.

That is, the AF 110 may request the measurement of the jitter to the UPF 104, and in this case, the AF 110 may request the measurement of the delay jointly. For example, when the AF 110 requests the measurement of the jitter to the NEF 120 through Nnef_AFsessionWithQoS_Create req and the NEF 120 requests the measurement of the jitter to the PCF 112 through Npcf_PolicyAuthorization_Create req, the PCF 112 may generate a PCC rule for the jitter measurement and request the measurement of the jitter to the SMF 114 through Npcf_SMPolicyControl_UpdateNotify req. Subsequently, the SMF 114 may request the measurement and a report of the jitter to the UPF 104 through N4 Session Modification req.

A procedure illustrated in FIG. 4 may be changed to various other schemes. For example, in step S401, Nnef_AFsessionWithQoS_Update req may be used instead of Nnef_AFsessionWithQoS_Create req. In step S403, Npcf_PolicyAuthorization_Update req may be used instead of Npcf_PolicyAuthorization_Create req. In step S405, Npcf_SMPolicyControl_Create resp or Npcf_SMPolicyControl_Update resp may be used instead of Npcf_SMPolicyControl_UpdateNotify req. In step S407, PFCP Session Establishment Request or PFCP Session Modification Request may be used instead of N4 Session Modification req.

Figure 5:
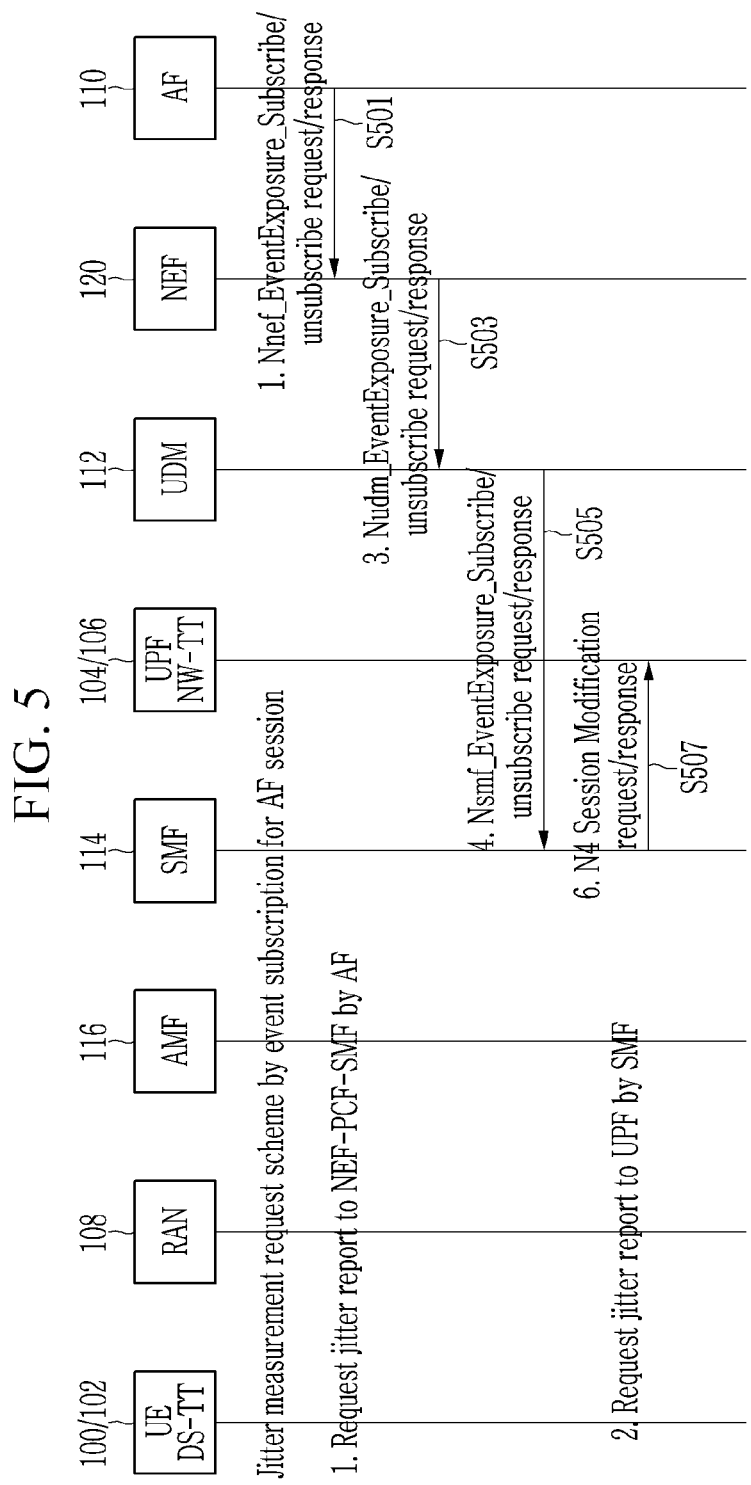
FIG. 5 is a diagram for describing an example method for requesting delay and jitter measurement according to an example embodiment of the present disclosure.

FIG. 5 is a diagram for describing an example method for requesting delay and jitter measurement according to an example embodiment of the present disclosure.

Referring to FIG. 5, the delay and jitter measurement request may be generated by event subscription of the AF session, and the receiving of the delay and jitter measurement request from the AF 110 by the UPF 104 may include receiving, by the UPF 104, the delay and jitter measurement request from the AF 110 through the NEF 120, the UDM 118, and the SMF 114

For example, the AF 110 may request the jitter measurement to the NEF 120 through Nnef_EventExposure_Subscribe req, the NEF 120 may request the jitter measurement to the UDM 118 through Nudm_EventExposure_Subscribe req, and the UDM 118 may request the jitter measurement to the SMF 114 through Nsmf_EventExposure_Subscribe req. Subsequently, the SMF 114 may request the measurement and the report of the jitter to the UPF 104 through N4 Session Modification req.

Figure 6:
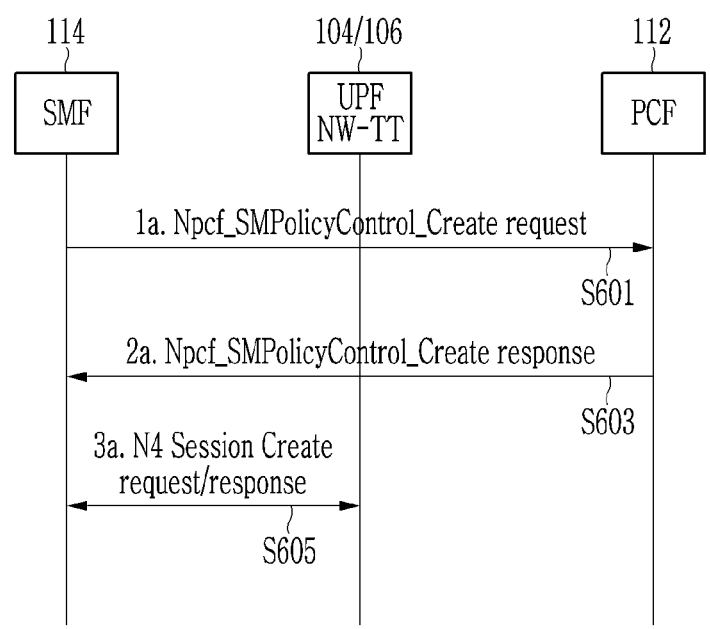
FIGS. 6 and 7 are diagrams for describing example methods for requesting jitter measurement according to an example embodiment of the present disclosure.
Figure 7:
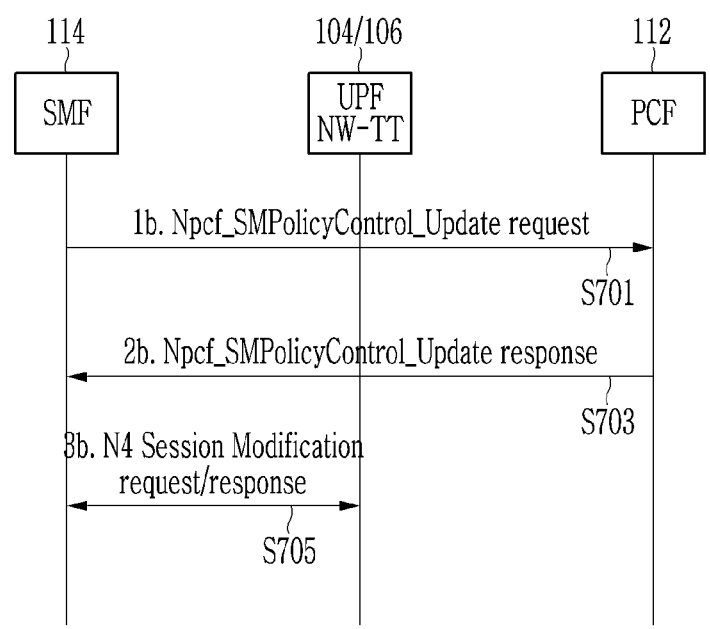

FIGS. 6 and 7 are diagrams for describing example methods for requesting jitter measurement according to an example embodiment of the present disclosure.

Referring to FIGS. 6 and 7, when the SMF 114 requests, to the PCF 112, a policy for a session to be serviced to the UE 100, the PCF 112 may specify a QoS to be serviced in the corresponding session, and further specify QoS monitoring. In the related art, a requirement for the jitter of the QoS flow is not included, but in the example embodiment, an acceptable requirement may be jointly specified as a jitter requirement for each QoS flow. Further, only a delay (Uplink Delay, Downlink Delay, RoundTripTime) is specified in the QoS flow even in the case of the QoS monitoring in the related art, but in the example embodiment, the QoS flow may further include a jitter (downlink jitter, uplink jitter).

When the session is generated in a step (S601) of FIG. 6 and the session is changed in a step (S701) of FIG. 7, steps S601 and S701 represent that the SMF 114 requests the policy to the PCF 112, each of a step (S603) of FIG. 6 and a step (S703) of FIG. 7 represents that the PCF 112 provides the policy to the SMF 114, and a step (S605) of FIG. 6 and a step (S705) of FIG. 7 represent the SMF 114 requests generation of and change of the session and the QoS flow to the UPF 104 according to the policy provided from the PCF 112.

Figure 8:
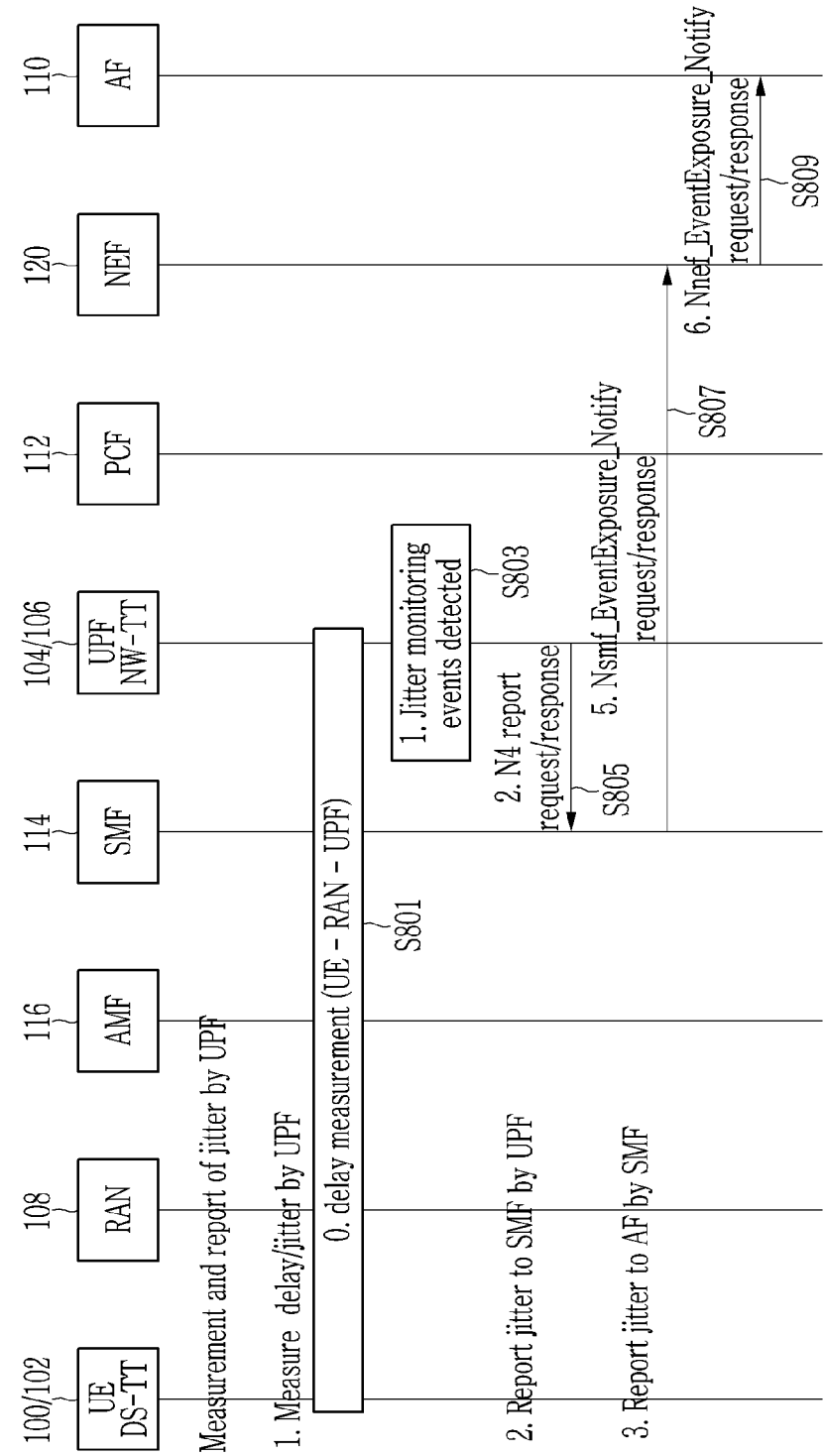
FIG. 8 is a diagram illustrating an example method of reporting a delay and a jitter measured according to an example embodiment of the present disclosure.

FIG. 8 is a diagram illustrating an example method of reporting a delay and a jitter measured according to an example embodiment of the present disclosure.

Referring to FIG. 8, a step of measuring, by the UPF 104, the delay and the jitter may include a step of measuring the delay and the jitter based on a difference between a time (TSs) when the UPF 104 transmits data and a time (TSr) when the UE 100 receives the data.

Further, a step of transmitting, by the UPF 104, the measured delay and jitter to the AF 110 may include a step of transmitting, by the UPF 104, the measured delay and jitter to the AF 110 through the SMF 114 and the NEF 120.

For example, in step S801, the UPF 104 measures the delay by using the above-described TSs–TSr in regard to FIG. 3, and in step S803, the jitter information is calculated by using delay information measured by the UPF 104, and then when a predetermined report condition for the measured jitter described in a first information element to be described below is satisfied, the UPF 104 may report the delay and the jitter to the SMF 114 through N4 report request (specifically, PFCP Session Report Request) in step S805, and the SMF 114 may report the delay and the jitter to the NEF 120 through Nsmf_EventExposure_Notify req and the NEF 120 may report the delay and the jitter to the AF 110 through Nnef_EventExposure_Notify req in step S807. The method illustrated in FIG. 8 may be applied to all of the request schemes illustrated in FIG. 4 or 5.

Figure 9:
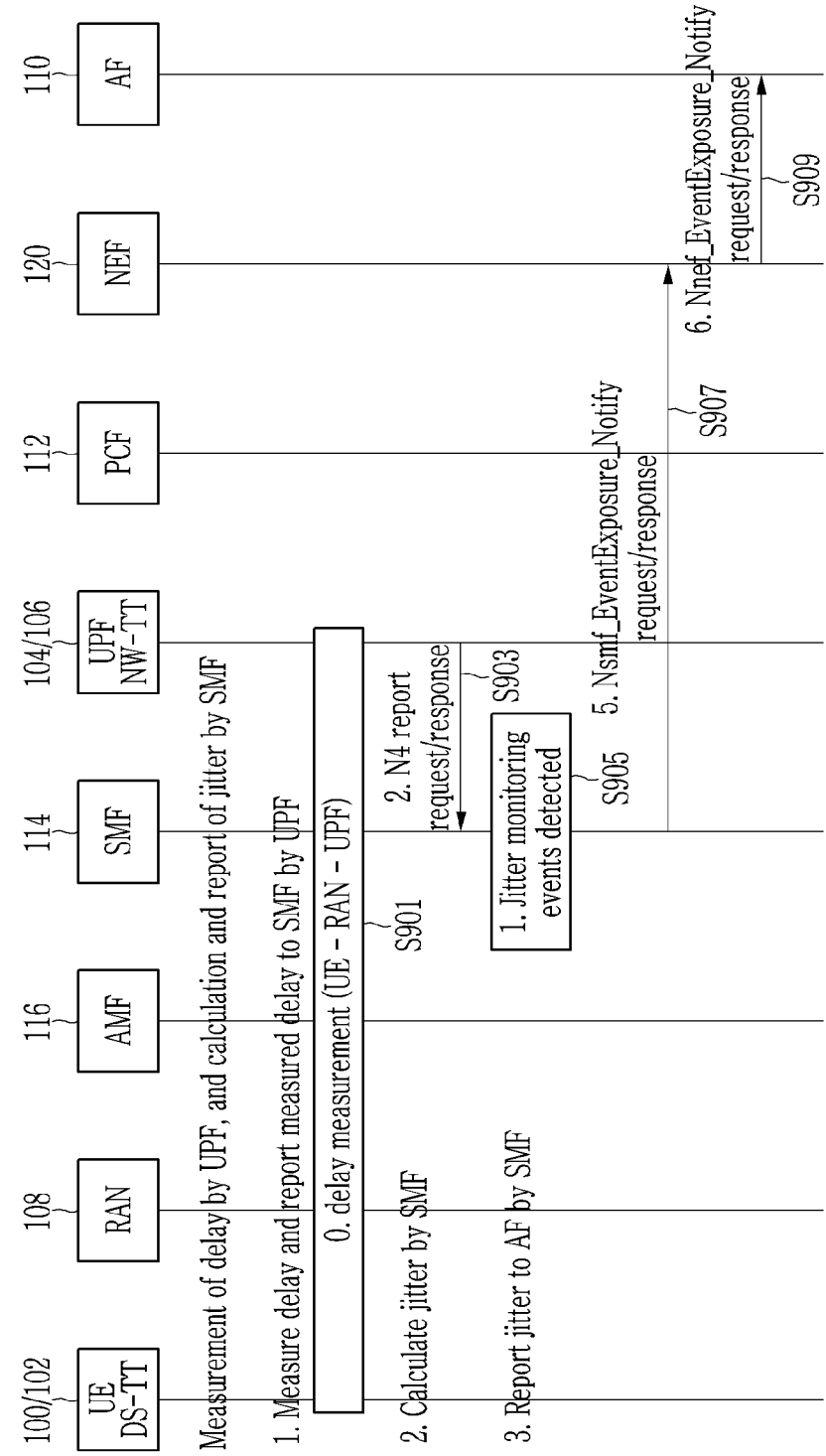
FIG. 9 is a diagram illustrating an example method of reporting a delay and a jitter measured according to an example embodiment of the present disclosure.

FIG. 9 is a diagram illustrating an example method of reporting a delay and a jitter measured according to an example embodiment of the present disclosure.

The jitter monitoring method according to an example embodiment of the present disclosure may include: a step of receiving, by the SMF 114, the delay and jitter measurement request from the AF 110; a step of transmitting, by the SMF 114, the delay measurement request to the UPF 104; a step of receiving, by the SMF 114, the delay measured by the UPF 104 from the UPF 104, a step of measuring, by the SMF 114, the jitter based on the delay received from the UPF 104; and a step of transmitting, by the SMF 114, the delay measured by the UPF 104 and the jitter measured by the SMF 114 to the AF 110. That is, when the UPF 104 measures only the delay and reports the measured delay to the SMF 114, the SMF 114 may calculate the jitter for the delay from the UPF 104 and report the calculated jitter to the AF 110.

Referring to FIG. 9, a step of receiving, by the SMF 114, the delay measured by the UPF 104 from the UPF 104 may include a step of receiving, by the SMF 114, from the UPF 104 a delay measured based on the difference between the time (TSs) when the UPF 104 transmits the data and the time (TSr) when the UE receives the data.

Further, a step of transmitting, by the SMF 114, the delay measured by the UPF 104 and the jitter measured by the SMF 114 to the AF 110 may include a step of transmitting, by the SMF 114, the delay measured by the UPF 104 and the jitter measured by the SMF 114 to the AF 110 through the NEF 120.

For example, in step S901, the UPF 104 measures the delay by using the above-described TSs–TSr in regard to FIG. 3, and in step S903, the UPF 104 reports the delay information to the SMF 114 through N4 report request (specifically, PFCP Session Report Request). In step S905, the SMF 114 calculates the jitter from the received delay information, and then when a predetermined report condition for the measured jitter described in a first information element to be described below is satisfied, the SMF 114 may report the delay and the jitter to the NEF 120 through Nsmf_EventExposure_Notify req in step S907 and report the delay and the jitter to the AF 110 through Nnef_EventExposure_Notify req in step S909. The method illustrated in FIG. 9 may be applied to all of the request schemes illustrated in FIG. 4 or 5.

Figure 10:
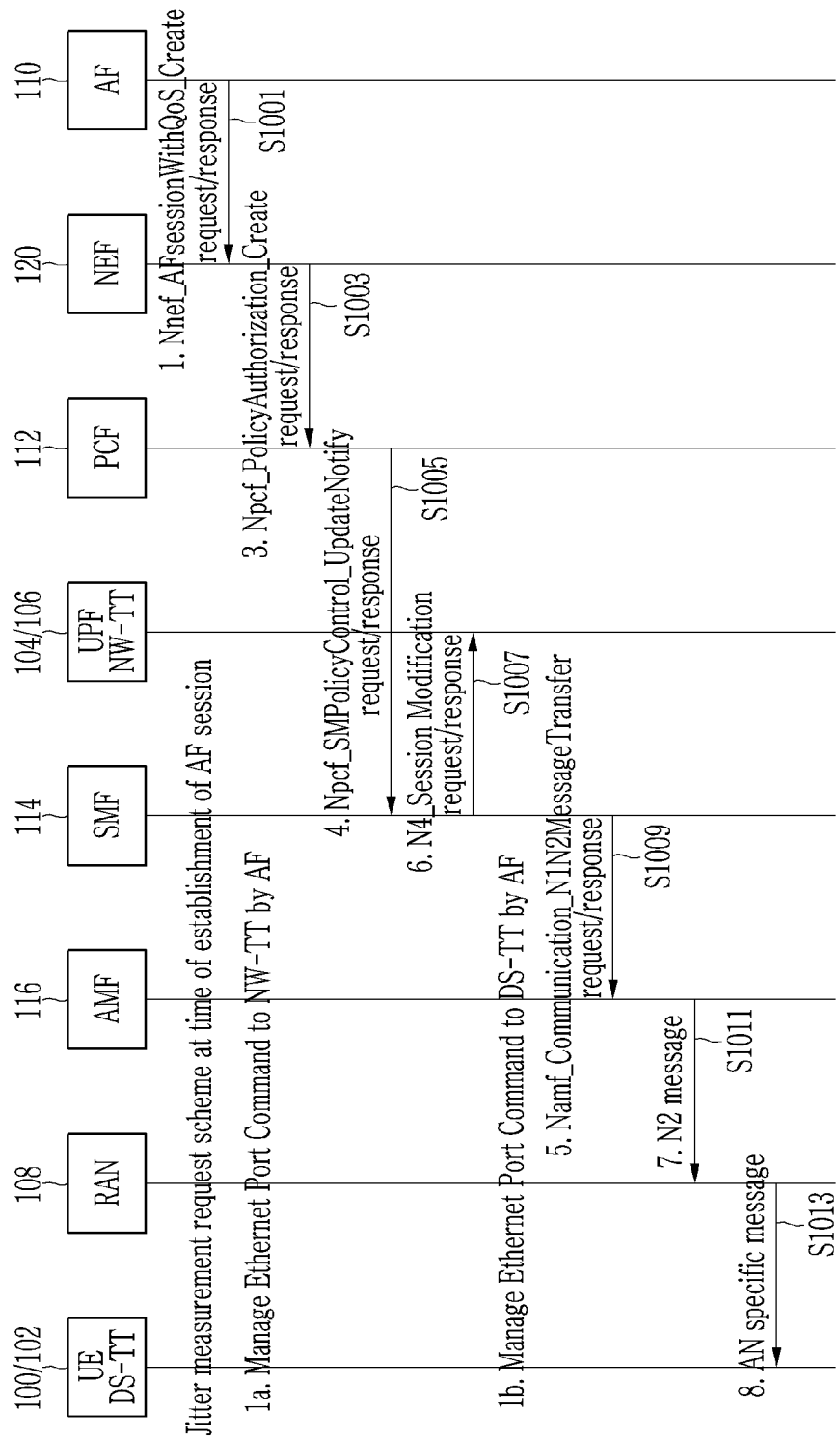
FIG. 10 is a diagram for describing an example method for requesting delay and jitter measurement according to an example embodiment of the present disclosure.

FIG. 10 is a diagram for describing an example method for requesting delay and jitter measurement according to an example embodiment of the present disclosure.

The jitter monitoring method according to an example embodiment of the present disclosure may include: receiving, by the NW-TT 106 or the DS-TT 102, a delay and jitter measurement request from the AF 110; measuring, by the NW-TT 106 or the DS-TT 102, a delay and a jitter in response to the delay and jitter measurement request; and transmitting the delay and the jittered measured by the NW-TT 106 or the DS-TT 102 to the AF 110.

Referring to FIG. 10, the delay and jitter measurement request may be generated at the time of establishment or modification the AF session, and a step of receiving of the delay and jitter measurement request from the AF 110 by the NW-TT 106 or the DS-TT 102 may include a step of receiving, by the NW-TT 106, the delay and jitter measurement request from the AF 110 through the NEF 120, the PCF 112, and the SMF 114 or a step of receiving by the DS-TT 102 the delay and jitter measurement request from the AF 110 through the NEF 120, the PCF 112, the SMF 114, the AMF 116, and the RAN 108.

That is, the AF 110 may request the measurement of the jitter to the NW-TT 106 or the DS-TT 102, and in this case, the AF 110 may request the measurement of the delay jointly. The scheme according to the example embodiment is effective when the QoS flow of the TSC to be measured is the same QoS flow as the time synchronization protocol, and a network entity that measures the TSe between the DS-TT 102 and the NW-TT 106 may calculate the delay by the scheme of calculating the delay by the above-described TSe−Tsi in regard to FIG. 3.

For example, in FIG. 10, steps S1001, S1003, and S1005 may be commonly used for transferring NW-TT_PMIC for the NW-TT 106 and transferring DS-TT_PMIC for the DS-TT 102, steps S1001, S1003, and S1005, and step S1007 may be applied for transferring the NW-TT_PMIC, and steps S1001, S1003, and S1005 and steps S1009, S1011, and S1013 may be applied for transferring the DS-TT_PMIC.

In FIG. 10, steps S1001, S1003, S1005, and S1007 are similar to the steps in FIG. 4. However, in the case of FIG. 4, the AF 110 requests the measurement of the jitter to the SMF 114, but in FIG. 10, an information element in which the AF 110 requests the measurement of the jitter to the DS-TT 102 or the NW-TT 106 may be included in a Port Management Information Container (PMIC) or a Bridge Management Information Container (BMIC). Information requested to the NW-TT 106 may be transferred to the NW-TT 106 through step S1007 and information requested to the DS-TT 102 may be transferred to the DS-TT 102 through steps S1009, S1011, and S1013.

Figure 11:
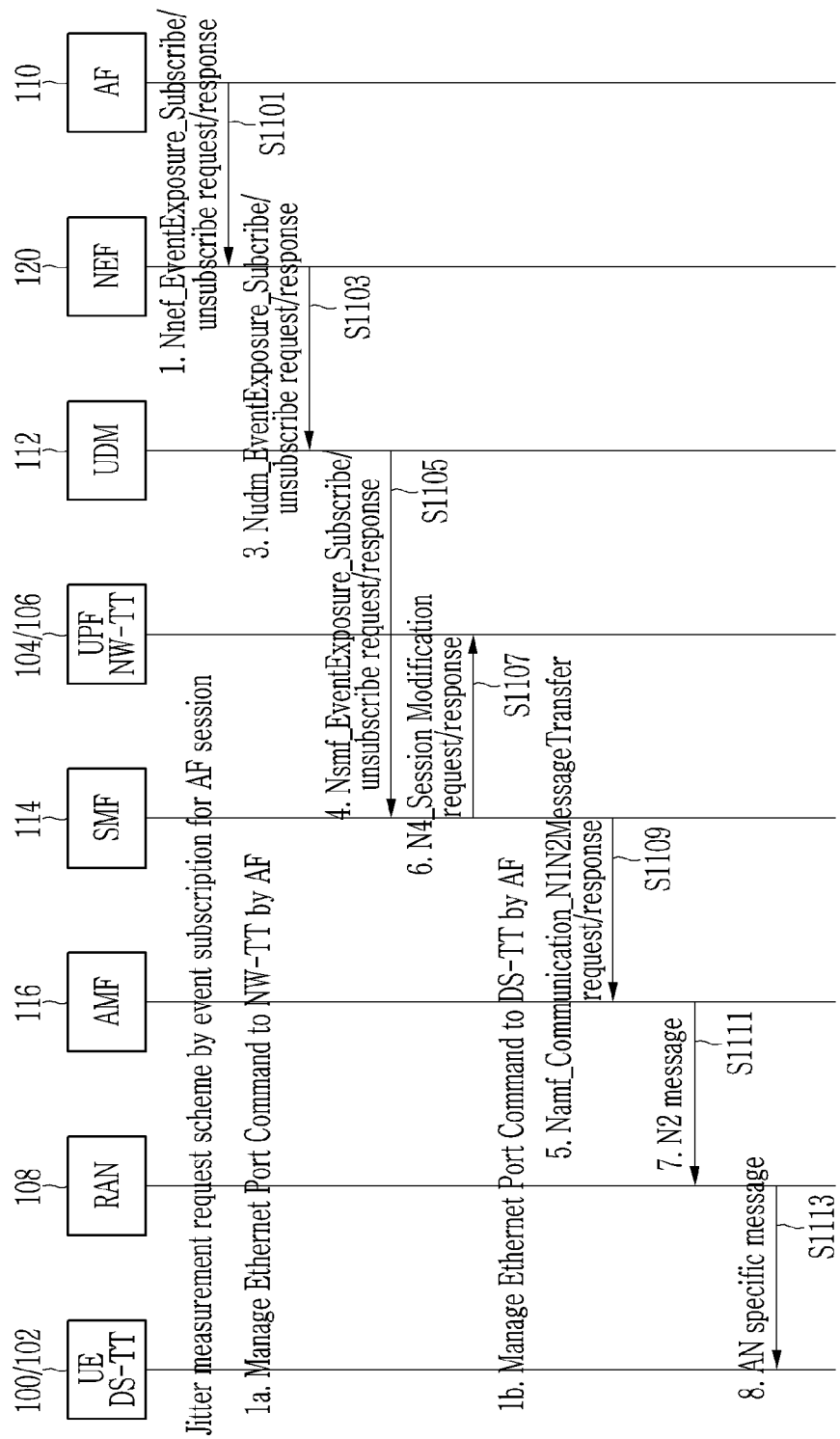
FIG. 11 is a diagram for describing an example method for requesting delay and jitter measurement according to an example embodiment of the present disclosure.

FIG. 11 is a diagram for describing an example method for requesting delay and jitter measurement according to an example embodiment of the present disclosure.

Referring to FIG. 11, the delay and jitter measurement request may be generated by the event subscription for the AF session, and the step of receiving of the delay and jitter measurement request from the AF 110 by the NW-TT 106 or the DS-TT 102 may include a step of receiving, by the NW-TT 106, the delay and jitter measurement request from the AF 110 through the NEF 120, the UDM 118, and the SMF 114 or a step of receiving by the DS-TT 102 the delay and jitter measurement request from the AF 110 through the NEF 120, the UDM 118, the SMF 114, the AMF 116, and the RAN 108.

For example, in FIG. 11, steps S1101, S1103, and S1105 may be commonly used for transferring NW-TT_PMIC for the NW-TT 106 and transferring DS-TT_PMIC for the DS-TT 102, steps S1101, S1103, and S1105, and step S1107 may be applied for transferring the NW-TT_PMIC, and steps S1101, S1103, and S1105 and steps S1109, S1111, and S1113 may be applied for transferring the DS-TT_PMIC.

In FIG. 11, steps S1101, S1103, and S1105, and S1107 are similar to the steps of FIG. 5. However, in the case of FIG. 5, the AF 110 requests the measurement of the jitter to the SMF 114, but in FIG. 11, an information element in which the AF 110 requests the measurement of the jitter to the DS-TT 102 or the NW-TT 106 may be included in the PMIC or the BMIC. Information requested to the NW-TT 106 may be transferred to the NW-TT 106 through step S1107 and information requested to the DS-TT 102 may be transferred to the DS-TT 102 through steps S1109, S1111, and S1113.

Figure 12:
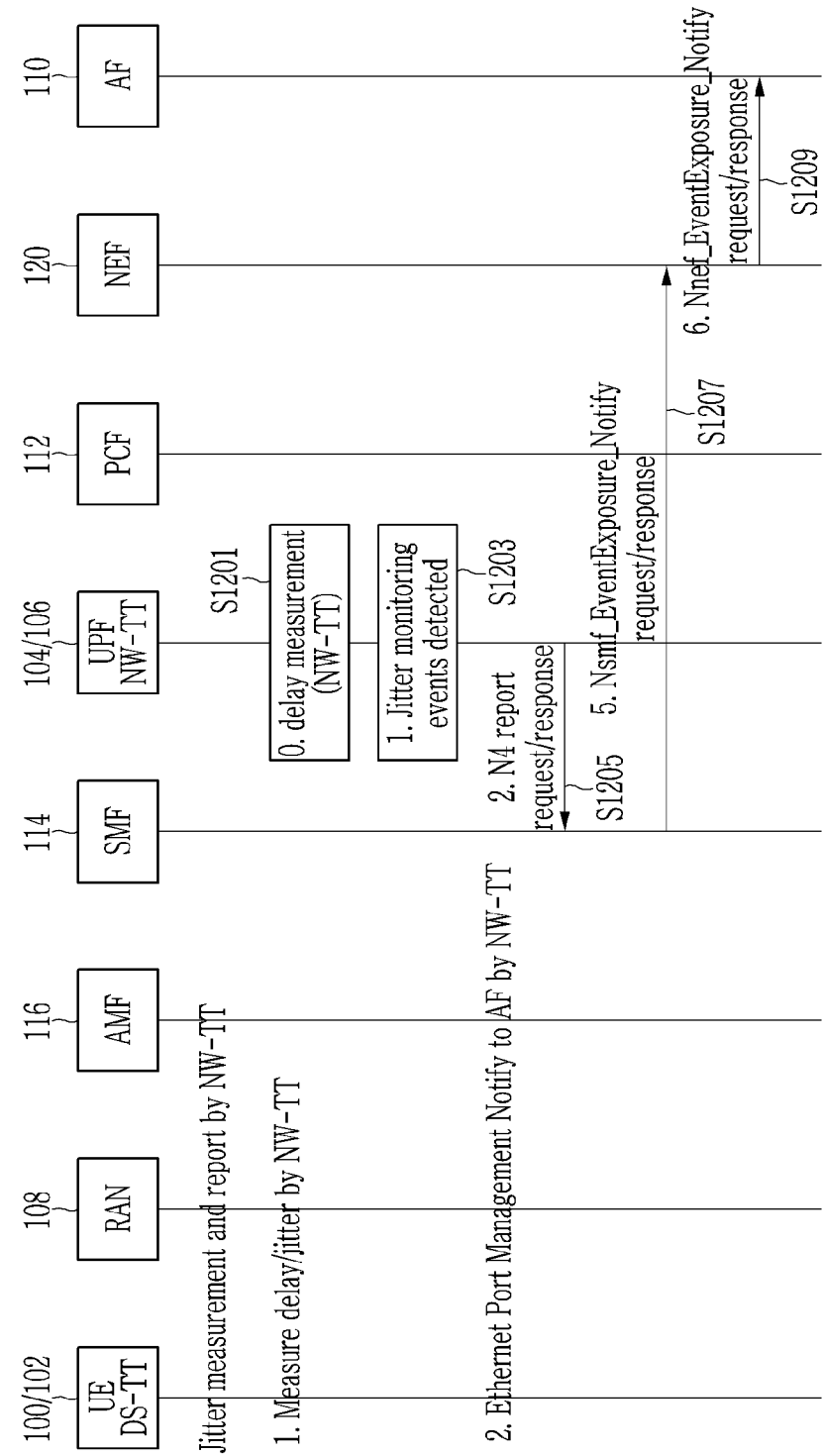
FIG. 12 is a diagram illustrating an example method of reporting a delay and a jitter measured according to an example embodiment of the present disclosure.

FIG. 12 is a diagram illustrating an example method of reporting a delay and a jitter measured according to an example embodiment of the present disclosure.

Figure 13:
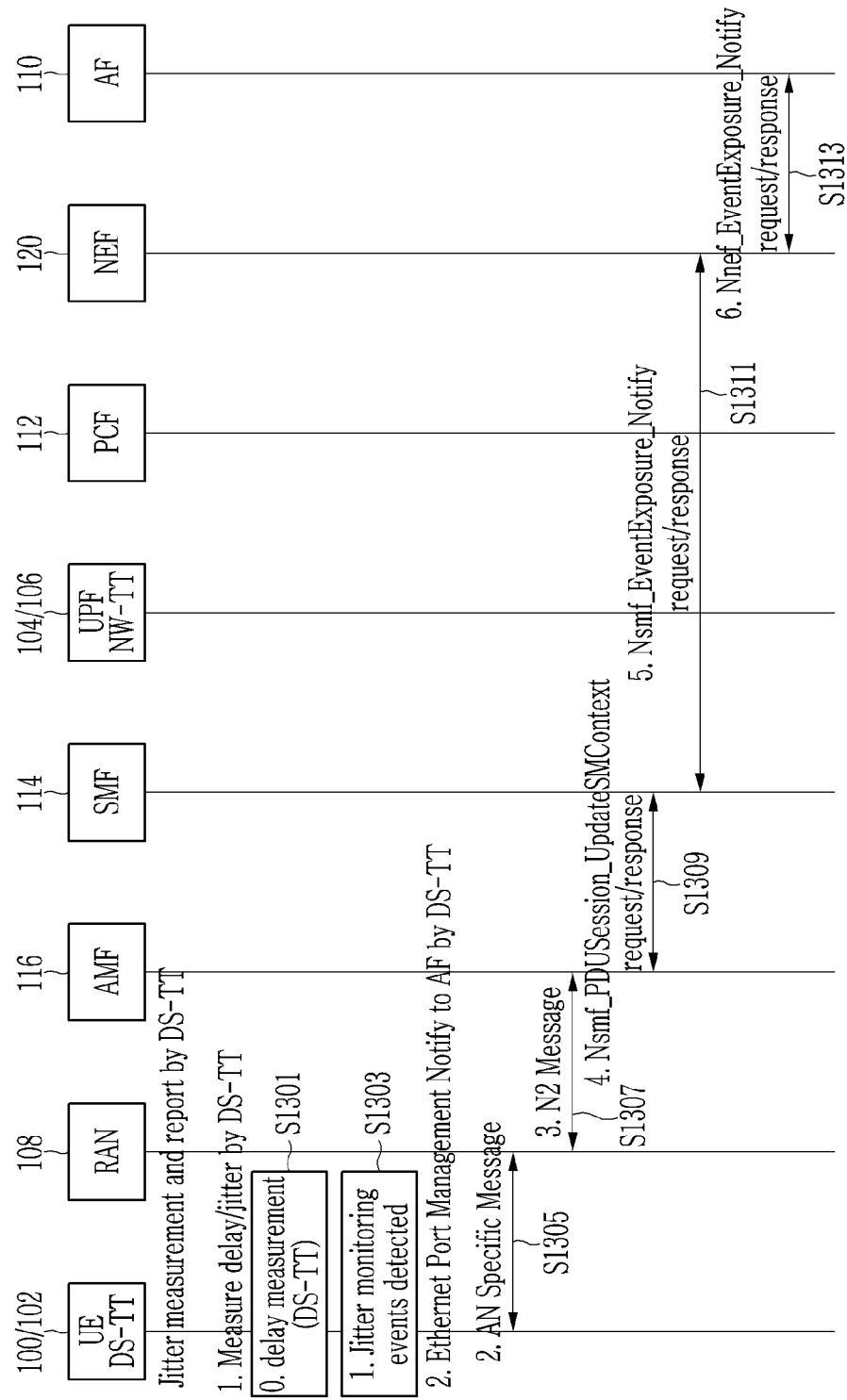
FIG. 13 is a diagram illustrating an example method of reporting a delay and a jitter measured according to an example embodiment of the present disclosure.

First, the jitter measured by the NW-TT 106 for the measurement request of the jitter received as in FIGS. 10 and 11 may be reported by a method illustrated in FIG. 12 and the jitter measured by the DS-TT 102 may be reported by a method illustrated in FIG. 13. In this case, the information of the delay may also be reported jointly.

Referring to FIG. 12, the step of measuring, by the NW-TT 106 or the DS-TT 102, the delay and the jitter may include a step of measuring, by the NW-TT 106, the delay and the jitter based on a difference between a time when the DS-TT 102 receives the time synchronization protocol message from the outside of the 5G system or a time (TSi) when the DS-TT 102 transmits the time synchronization protocol message to the NW-TT 106, and a time (TSe) when the NW-TT 106 receives the time synchronization protocol message or a time when the NW-TT 106 transmits the time synchronization protocol message to the outside of the 5G system.

Further, a step of transmitting, by the NW-TT 106, the measured delay and jitter to the AF 110 may include a step of transmitting, by the NW-TT 106, the measured delay and jitter to the AF 110 through the SMF 114 and the NEF 120.

For example, based on TSi when the DS-TT 102 sends the time synchronization protocol message and TSe when the NW-TT 106 sends the time synchronization protocol message, the NW-TT 106 may measure the delay by using the above-described TSe−TSi in regard to FIG. 3 in step S1201, and when a predetermined report condition for the measured jitter described in a fifth information element to be described below is satisfied in step S1203, the NW-TT 106 may report the delay and the jitter to the SMF 114 through N4 report request (specifically, PFCP Session Report Request or PFCP Session Modification Response) via the UPF 104 in step S1205, the SMF 114 may report the delay and the jitter to the NEF 120 through Nsmf_EventExposure_Notify req in step S1207, and the NEF 120 may report the delay and the jitter to the AF 110 through Nnef_EventExposure_Notify req in step S1209. The report of the NW-TT 106 may be transferred from the UPF 104 to the AF 110 in the form of the PMIC or BMIC.

FIG. 13 is a diagram illustrating an example method of reporting a delay and a jitter measured according to an example embodiment of the present disclosure.

Referring to FIG. 13, the step of measuring, by the NW-TT 106 or the DS-TT 102, the delay and the jitter may include a step of measuring, by the DS-TT 102, the delay and the jitter based on a difference between a time when the NW-TT 106 or another DS-TT receives the time synchronization protocol message from the outside of the 5G system or the time (TSi) when the NW-TT 106 or another DS-TT transmits the time synchronization protocol message to the DS-TT 102 and a time when the DS-TT 102 receives the time synchronization protocol message or a time (TSe) when the DS-TT 102 transmits the time synchronization protocol message to the outside of the 5G system.

Further, a step of transmitting, by the DS-TT 102, the measured delay and jitter to the AF 110 may include a step of transmitting, by the DS-TT 102, the measured delay and jitter to the AF 110 through the RAN 108, the AMF 116, the SMF 114 and the NEF 120.

For example, based on TSi when the NW-TT 106 or another DS-TT 102 sends the time synchronization protocol message and TSe when the corresponding DS-TT 102 sends the time synchronization protocol message, the corresponding DS-TT 102 may measure the delay by using the above-described TSe−TSi in regard to FIG. 3 in step S1301, and in step S1303, when the predetermined report condition of the measured jitter described in the fifth information element to be described below is satisfied, the jitter report of the DS-TT 102 may be transferred to the AF 110 via the UE 100 through steps S1305 to 1313. The report of the DS-TT 102 may be transferred from the UE 100 to the AF 110 in the form of the PMIC or BMIC.

Information Element of Requesting Control and Measurement of Jitter to UPF

In order to respond to the request for the jitter measurement and report of the AF 110 as in FIGS. 4 to 7, Npcf_SM-PolicyUpdateNotify req which the PCF 112 transmits to the SMF 114 and Nsmf_EventExposure_Subscribe req which the UDM 118 transmits to the SMF 114 may include the following first information elements.

First information elements to be included in N4 Session Create req in step S605 of FIG. 6 and N4 Session Modification req in steps S407, S507, and S705 of FIGS. 4, 5, and 7:

QER
    QFI
      JitterThresholdUI, JitterThresholdDI (service requirements for the jitter)
  QoS Monitoring per QoS flow Control Information
    QFI
    Requested QoS Monitoring
      dlDelay, ulDelay, rtDelay
      ulJitter, dlJitter, samplingFreq
    Reporting Frequency
      Event-triggered, Periodic, Session-released
    Packet Delay Thresholds
      DIThreshold, UIThreshold, RtThreshold
    Jitter Thresholds
      repJItterThresholdDI, repJItterThresholdUI (monitoring report requirements for the jitter)
    Minimum Wait Time
      minimumDelayWaitTime
      minimumJitterWaitTime
    Measurement Period of Delay
    Measurement Period of Jitter Meanwhile, the SMF 114 may include the following second information element in N4 Session Modification req transmitted to the UPF 104.

Second information elements to be included in Npcf_SMPolicyControl_UpdateNotify req in step S405 of FIG. 4, Npcf_SMPolicyControl_Create req and Npcf_SMPolicyControl_Update req in steps S601 and S701 of FIGS. 6 and 7, and Nsmf_EventExposure_Subscribe req in step S505 of FIG. 5:

qosDecs
    5qi
    JitterThresholdDI, JitterTresholdUI (service requirements for the jitter)
  qosMonDecs
    QosMonitoringData
      qmid[ ]
        reQQoSMonParams [ ]
          ulDelay, dlDelay, rtDelay
          ulJitter, dlJitter, samplingFreq
        repFreqs
          Event-triggered, Periodic, Session-released
        repThreshDI, repThreshUI, repThreshRt, waitDelayTime
        repThreshJitterDI, repThreshJitterUI, waitJitterTime (monitoring report requirements for the jitter)
        repPeriod of Delay
        repPeriod of Jitter
        notifyUri In the second information element, qosMonDesc includes QosMonitoringData as a description for QoSMonitoring which the PCF requests to the SMF. QoSMonitoringData includes qmIDs which are identifiers of QoSMonitoring, and includes an uplink delay, a downlink delay, a round-trip delay, the uplink jitter, and the downlink jitter as parameters of QoSMonitoring. Furthermore, QoSMonitoringData may further include a sampling period. Event based, periodic, and time of session release are determined as a report period (repFreqs), and the event based includes a wait time (waitDelayTime) among downlink delay-threshold, uplink delay-threshold, round-trip delay-threshold, event based report for delay and a wait time (waitJitterTime) among downlink jitter-threshold, uplink jitter-threshold, and event based report for jitter as a threshold value. The periodic report includes a report period and designates URI to be reported.

QoS Monitoring per QoS flow Control Information in the first information element is information on QoSMonitoring which the SMF requests to the UPF. QoS Monitoring per QoS flow Control Information includes the uplink delay, the downlink delay, the round-trip delay, the uplink jitter, and the downlink jitter as QFI designating the QoS flow to be subjected to QoSMonitoring and parameters to be subjected to QosMonitoring. Furthermore, QoS Monitoring per QoS flow Control Information may further include a sampling period. Event based, periodic, and time of session release are determined as a report period (Reporting Frequency), and the event based includes downlink delay-threshold, uplink delay-threshold, and round-trip delay-threshold as delay threshold values, and downlink jitter-threshold and uplink jitter-threshold as jitter threshold values. The event based report includes a wait time (minimumDelayWaitTime) among the event based reports for the delay and a wait time (minimumJitterWaitTime) among the event based reports for the jitter in the event based report. The periodic report includes a measurement period. The detailed information elements of the first information element and the second information element may be selectively used.

Information Element Reporting Jitter Measured by UPF

In order to respond to the request for the jitter measurement and report of the AF 110 as in FIG. 8, the UPF 104 may include the following third information elements in N4 report req for transmitting the measured jitter to the SMF 114.

Third information elements to be included in N4 report req in step S803 of FIG. 8:

QoS Monitoring Report
    QFI
    QoS Monitoring Measurement
      dlDelay, ulDelay, rtDelay
      ulJitter, dlJitter
      :A(k)
      :maxJ(j:k)
      :meanD(j:k)
      :maxD(j:k)
      :minD(j:k)
      :varD(j:k)
    Time Stamp
    Start Time Meanwhile, the SMF 114 may include the following fourth information elements in Nsmf_EventExposure_Notify req transmitted to the NEF 120.

Fourth information elements to be included in Nsmf_EventExposure_Notify req in step S805 of FIG. 8:

qosMonReports
    QosMonitoringReport
      ref PccRulelds[ ]
      ulDelays[ ], dlDelays[ ], rtDelays[ ]
      ulJitters[ ], dlJitter[ ]

:A(k)
:maxJ(j:k)
:meanD(j:k)
:maxD(j:k)
:minD(j:k)
:varD(j:k)

In the third information element, QoS Monitoring Report is information which the UPF reports to the SMF. QoS Monitoring Report includes the uplink delay, the downlink delay, the round-trip delay, the uplink jitter, and the downlink jitter as QFI designating the QoS flow to be subjected to QoSMonitoring and parameters to be subjected to QosMonitoring. Each of the uplink/downlink jitter may include the statistical change characteristics (A(k)) of the jitter, the maximum jitter, the average delay, the maximum delay, the minimum delay, and a distribution of the delay. Time Stamp represents a time of reporting the QoSMonitoring and Start Time represents a time of starting the QoSMonitoring.

In the fourth information element, qosMonRepoort as contents in which the SMF reports QoSMonitoring to the NEF includes QosMonitoringReport. QosMonitoringReport includes refPccRuleIds which are an identifier for PccRule applying QoSMonitoring and a result value of QoSMonitoring includes the uplink delay, the downlink delay, and the round-trip delay. Report contents of the jitter includes the uplink jitter and the downlink jitter, and each of the uplink/downlink jitter may include the statistical change characteristics (A(k)) of the jitter, the maximum jitter, the average delay, the maximum delay, the minimum delay, and the distribution of the delay. In the fourth information element, a mark [ ] represents that one or more PccRuleIds may be reported even in a form of a list. The detailed information elements of the third information element and the fourth information element may be selectively used.

Information Element Requesting Measurement of Jitter to NW-TT/DS-TT and Reporting Jitter Measured by NW-TT/DS-TT As an information element for instructing the measurement and the report of the jitter and receiving the report from the AF 110 to the NW-TT 106 or the DS-TT 102 as in FIGS. 10 and 11, the AF 110 configures a port management information container (PMIC) like the fifth information element in order to instruct the measurement and the report of the jitter to the NW-TT 106 or the DS-TT 102 and the report of the jitter measured by the NW-TT 106 or the DS-TT 102 configures the PMIC like the sixth information element.

Fifth information element to be included in PMIC or BMIC of each message of FIGS. 10 and 11 (DS-TT/NW-TT←AF):
DS-TT_PMIC, NW-TT_PMIC
  Manage Ethernet Port Command
    Set parameter
      TWD
      Requested QoS Monitoring
        Delay
        Jitter, samplingFreq
      Reporting Frequency
        Event-triggered, Periodic
      Packet Delay Thresholds
        DelayThreshold
      Jitter Thresholds
        JItterThreshold
      Minimum Wait Time
        minimumDelayWaitTime
        minimumJitterWaitTime
      Measurement Period Subscribe-notify
      QoS Monitoring Measurement
        Delay
        Jitter Sixth information element to be included in PMIC or BMIC of each message of FIGS. 12 and 13 (DS-TT/NW-TT→AF):
DS-TT_PMIC, NW-TT_PMIC
  Ethernet Port Management Notify
    Measurement Report
      TWD
      QoS Monitoring Measurement
        Delay
        Jitter
        : A(k)
        : maxJ(j:k)
        : meanD(j:k)
        : maxD(j:k)
        : minD(j:k)
        : varD(j:k)
      Time Stamp
      Start Time In the fifth information element, DS-TT_PMIC for DS-TT and NW-TT_PMIC for NW-TT as a container containing port management information (PMI) which the AF transfers to the DS-TT or NW-TT contains Manage Ethernet Port Command which is a command for a port therein. The fifth information element may include TWD representing TSN working domain as information for parameter setting of the port, and the delay and the jitter, and the sampling period as parameters to be subjected to QosMonitoring. Event based and periodic may be selected as the report period and the report period may include a threshold value of the delay or the jitter. The fifth information element may include a wait time (minimumDelayWaitTime) among the event based reports for the delay and a wait time (minimumJitterWaitTime) among the event based reports for the jitter in the event based report. The periodic report includes a measurement period. Moreover, matters to be reported to the AF as Subscribe-notify specify a delay or a jitter measured by QoS Monitoring Measurement.

In the sixth information element, the delay or the jitter measured by the DS-TT or NW-TT is contained in NW-TT_PMIC which the NW-TT reports to the AF and DS-TT_PMIC which the DS-TT reports to the AF. Ethernet Port Management Notify reported by the port of the DS-TT or NW-TT contains the measurement report. Information reported by each DS-TT or NW-TT includes the TWD of the delay/jitter, and a delay value and a jitter. The information may include the statistical change characteristics (A(k)) of the jitter, the maximum jitter, the average delay, the maximum delay, the minimum delay, and the distribution of the delay. Time Stamp represents a time of generating the report message Start Time represents a time of starting the measurement. The detailed information elements of the fifth information element and the sixth information element may be selectively used.

In the specification, the PMIC is primarily described as an example, but a section of generating the delay/jitter may also be considered as the bridge, and included in the Bridge Management Information Container (BMIC) and used. The PMIC/BMIC is directly transferred between the AF 110 and the NW-TT 106/DS-TT 102 in FIGS. 10 to 13. In particular, the delay/jitter may also be measured by the DS-TT and reported to the BMIC unlike the related art in which the DS-TT is designed not to report the BMIC.

Figure 14:
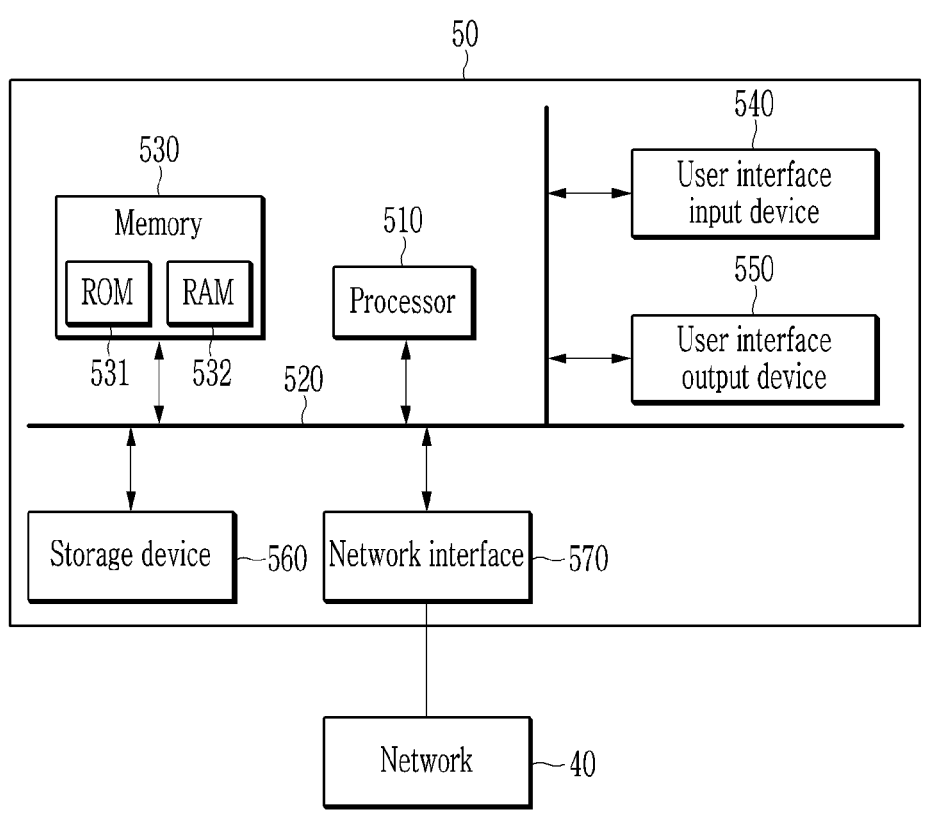
FIG. 14 is a block diagram for describing a computing device according to an example embodiment of the present disclosure.

FIG. 14 is a block diagram for describing a computing device according to an example embodiment of the present disclosure.

Referring to FIG. 14, a computing device 50 may become the network entity of the 5G system, e.g., the UE 100, the DS-TT 102, the UPF 104, the NW-TT 106, the RAN 108, the TSN AF 110, the PCF 112, the SMF 114, the AMF 116, the UDM 118, and the NEF 120. In addition, the jitter monitoring method for the time sensitive communication in the wireless communication system according to the example embodiments of the present disclosure may be implemented by using the computing device 50.

The computing device 50 may include at least one of a processor 510, a memory 530, a user interface input device 540, a user interface output device 550, and a storage device 560 which communicate through a bus 520. The computing device 50 may also include a network interface 570 electrically connected to the network 40, e.g., a wireless network. The network interface 570 may transmit and receive data to and from another network entity through the network 40.

The processor 510 may be implemented by various types including an application processor (AP), a central processing unit (CPU), a graphic processing unit (GPU), etc., and may be any electronic device executing a command stored in the memory 530 or the storage device 560. The processor 510 may be configured to implement functions and methods described in FIGS. 1 to 13.

The memory 530 and the storage device 560 may be various types of volatile or non-volatile storage media. For example, the memory may include a read-only memory (ROM) 531 and a random access memory (RAM) 532. In an example embodiment of the present disclosure, the memory 530 may be positioned inside or outside the processor 510 and the memory 530 may be connected to the processor 510 though various means which is already known.

Further, the jitter monitoring method for the time sensitive communication in the wireless communication system according to the example embodiments of the present disclosure may be implemented by a program or software executed by the computing device 50, and the program or the software may be stored in a computer readable medium.

In addition, the jitter monitoring method for the time sensitive communication in the wireless communication system according to the example embodiments of the present disclosure may be implemented by hardware which may be electrically connected to the computing device 50.

According to the example embodiments of the present disclosure, measurement and calculation for the delay/jitter which occurs in the virtual bridge are accurately performed to make the AF effectively schedule the operation of the DS-TT or NW-TT of the virtual bridge in order to support scheduled traffic to be used in the time sensitive communication.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A method of jitter monitoring for time sensitive communication in a wireless communication network, the method comprising:
   receiving, by a user plane function (UPF), a delay and jitter measurement request from an application function (AF);
   measuring, by the UPF, a delay and a jitter in response to the delay and jitter measurement request; and
   transmitting, by the UPF, the measured delay and jitter to the AF,
   wherein the delay is determined based on a difference between a time when the UPF transmits data and a time at which a user equipment (UE) receives the data,
   wherein the jitter is determined based on at least one of a maximum difference between a measured delay value and a mean delay value in a set of delay measurements, and a variance value of the set of delay measurements,
   wherein the UPF is configured for Quality of Service (QOS) monitoring including measuring of the delay and the jitter, and for reporting based on a reporting frequency;
   wherein the reporting frequency is configurable for event-triggered reporting, such that if the measured jitter exceeds a predetermined jitter threshold value, the UPF reports the measured jitter to the AF based on the event-triggered reporting; and
   wherein the reporting frequency is also configurable for periodic reporting based on a predetermined measurement period.

2. The method of claim 1, wherein:
   the delay and jitter measurement request is generated at a time of establishment or modification of an AF session, and
   the receiving of the delay and jitter measurement request from the AF by the UPF includes receiving, by the UPF, the delay and jitter measurement request from the AF through at least one of a network exposure function (NEF), a policy control function (PCF), and a session management function (SMF).

3. The method of claim 2, wherein:
   the delay and jitter measurement request is generated by event subscription for the AF session, and
   the receiving of the delay and jitter measurement request from the AF by the UPF includes receiving, by the UPF, the delay and jitter measurement request from the AF through at least one of the NEF, unified data management (UDM), and the SMF.

4. The method of claim 2, wherein:
   the transmitting of the measured delay and jitter to the AF by the UPF includes transmitting, by the UPF, the measured delay and jitter to the AF through at least one of the SMF and the NEF.

5. The method of claim 1, wherein:
   the measuring of the delay and the jitter by the UPF includes at least one of measuring the delay and the jitter based on a difference between a time when the UPF transmits data and a time when a user equipment (UE) receives the data, and
   measuring the delay and the jitter based on a difference between a time when the UE transmits the data and a time when the UPF receives the data.

6. Apparatus for jitter monitoring for time sensitive communication in a wireless communication network, the apparatus comprising:
   a memory; and
   a processor operably connected to the memory;
   wherein the processor is configured to:
   receive, by a user plane function (UPF), a delay and jitter measurement request from an application function (AF);
   measure, by the UPF, a delay and a jitter in response to the delay and jitter measurement request; and
   transmit, by the UPF, the measured delay and jitter to the AF,
   wherein the delay is determined based on a difference between a time when the UPF transmits data and a time at which a user equipment (UE) receives the data,
   wherein the jitter is determined based on at least one of a maximum difference between a measured delay value and a mean delay value in a set of delay measurements, and a variance value of the set of delay measurements,
   wherein the UPF is configured for Quality of Service (QOS) monitoring including measuring of the delay and the jitter, and for reporting based on a reporting frequency;
   wherein the reporting frequency is configurable for event-triggered reporting, such that if the measured jitter exceeds a predetermined jitter threshold value, the UPF reports the measured jitter to the AF based on the event-triggered reporting; and
   wherein the reporting frequency is also configurable for periodic reporting based on a predetermined measurement period.

7. The apparatus of claim 6,
   wherein the delay and jitter measurement request is generated at a time of establishment or modification of an AF session, and
   wherein the processor is configured to, in order to receive the delay and jitter measurement request from the AF by the UPF, receive, by the UPF, the delay and jitter measurement request from the AF through at least one of a network exposure function (NEF), a policy control function (PCF), and a session management function (SMF).

8. The apparatus of claim 7, wherein the delay and jitter measurement request is generated by event subscription for the AF session, and
wherein the processor is configured to, in order to receive the delay and jitter measurement request from the AF by the UPF, receive, by the UPF, the delay and jitter measurement request from the AF through at least one of the NEF, unified data management (UDM), and the SMF.

9. The apparatus of claim 7, wherein the processor is configured to, in order to transmit the measured delay and jitter to the AF by the UPF, transmit, by the UPF, the measured delay and jitter to the AF through at least one of the SMF and the NEF.

10. The apparatus of claim 6, wherein the measuring of the delay and the jitter by the UPF includes at least one of measuring the delay and the jitter based on a difference between a time when the UPF transmits data and a time when a user equipment (UE) receives the data, and
wherein the processor is configured to measure the delay and the jitter based on a difference between a time when the UE transmits the data and a time when the UPF receives the data.

* * * * *